US011780958B2

(12) United States Patent
Coates et al.

(10) Patent No.: US 11,780,958 B2
(45) Date of Patent: Oct. 10, 2023

(54) BETAPROPIOLACTONE AND FUNCTIONALIZED BETAPROPIOLACTONE BASED POLYMER SYSTEMS

(71) Applicant: Novomer, Inc., Rochester, NY (US)

(72) Inventors: Geoffrey W. Coates, Lansing, NY (US); Jeffrey K. Uhrig, Media, PA (US); Eric Stoutenburg, Rochester, NY (US)

(73) Assignee: Novomer, Inc., Rochester, NY (US)

( * ) Notice: Subject to any disclaimer, the term of this patent is extended or adjusted under 35 U.S.C. 154(b) by 0 days.

(21) Appl. No.: 18/020,722

(22) PCT Filed: Aug. 13, 2021

(86) PCT No.: PCT/US2021/045912
§ 371 (c)(1),
(2) Date: Feb. 10, 2023

(87) PCT Pub. No.: WO2022/040040
PCT Pub. Date: Feb. 24, 2022

(65) Prior Publication Data
US 2023/0227605 A1 Jul. 20, 2023

Related U.S. Application Data

(60) Provisional application No. 63/066,451, filed on Aug. 17, 2020.

(51) Int. Cl.
C08G 63/08 (2006.01)
C09D 167/04 (2006.01)
B32B 27/08 (2006.01)
B32B 27/36 (2006.01)

(52) U.S. Cl.
CPC .............. *C08G 63/08* (2013.01); *B32B 27/08* (2013.01); *B32B 27/36* (2013.01); *C09D 167/04* (2013.01); *B32B 2250/02* (2013.01); *B32B 2250/24* (2013.01); *B32B 2307/7163* (2013.01)

(58) Field of Classification Search
None
See application file for complete search history.

(56) References Cited

U.S. PATENT DOCUMENTS

| | | |
|---|---|---|
| 3,897,513 A | 7/1975 | Sundet |
| 5,648,452 A | 7/1997 | Schechtman |
| 10,065,914 B1 | 9/2018 | Ruhl et al. |
| 10,144,802 B2 | 12/2018 | Sookraj |
| 10,428,165 B2 | 10/2019 | Sookraj |
| 10,500,104 B2 | 12/2019 | Sookraj |
| 10,597,294 B2 | 3/2020 | Sookraj |
| 10,662,283 B2 | 5/2020 | Farmer et al. |
| 10,669,373 B2 | 6/2020 | Sookraj |
| 10,676,426 B2 | 6/2020 | Sookraj |
| 10,683,390 B2 | 6/2020 | Farmer et al. |
| 10,711,095 B2 | 7/2020 | Sookraj |
| 10,899,622 B2 | 1/2021 | Sookraj et al. |
| 11,078,172 B2 | 8/2021 | Sookraj et al. |
| 11,351,519 B2 | 6/2022 | Lee et al. |
| 2017/0080409 A1 | 3/2017 | Farmer et al. |
| 2018/0029005 A1 | 2/2018 | Sookraj |
| 2018/0094100 A1 | 4/2018 | Farmer et al. |
| 2018/0155490 A1 | 6/2018 | Sookraj |
| 2019/0002385 A1 | 1/2019 | Sookraj et al. |
| 2020/0061578 A1 | 2/2020 | Sookraj et al. |
| 2020/0369825 A1 | 11/2020 | Vakil |
| 2021/0324168 A1 | 10/2021 | Vakil |
| 2022/0280928 A1 | 9/2022 | Williams et al. |

FOREIGN PATENT DOCUMENTS

| | | |
|---|---|---|
| CA | 855703 A | 11/1970 |
| EP | 0686656 A2 | 12/1995 |
| JP | S5996177 A | 6/1984 |
| JP | H08323946 A | 12/1996 |
| WO | 2019221925 A1 | 11/2019 |
| WO | 2020185420 A1 | 9/2020 |
| WO | 2022040040 A1 | 2/2022 |

OTHER PUBLICATIONS

International Preliminary Report on Patentability for International Application PCT/US2021/045912 dated Dec. 7, 2022 (20 pages).
International Search Report and Written Opinion for International Application PCT/US2021/045912 dated Dec. 22, 2021 (15 pages).
Jaffredo, Cedric G. et al., "Organocatalyzed controlled ROP of (beta)-lactones towards poly(hydroxyalkonaote)s: from (beta)-butyrolactone to benzyl (beta)-malolactone polymers." Polymer chemistry, vol. 4, Apr. 24, 2013, pp. 3837-3850, XP055869227.
Kramer, J.W. et al., "Fluorinated b-lactones and poly(b-hydroxyalkanoates): synthesis via epoxide carbonylation and ring-opening polymerization." Tetrahedron, Elsevier Science Publishers, Amsterdam NL, vol. 64, No. 29, Jul. 14, 2008, pp. 6973-6978.

(Continued)

*Primary Examiner* — Terressa Boykin
(74) *Attorney, Agent, or Firm* — Young Basile Hanlon & MacFarlane, P.C.

(57) ABSTRACT

Disclosed herein are polymers, copolymers and polymer systems based on polypropiolactones which can be biodegradable and can enhance the recyclability of polymer systems, which can be functionalized to introduce desired functionality into the polymers and/or which may optionally be prepared from renewable raw materials. Disclosed are novel functionalized beta propiolactones. Some of the novel functionalized beta propiolactones have functional groups bound to the ring structure of the lactone that provide improved polymer systems. Disclosed are novel homopolymers of the functionalized beta propiolactones. Disclosed are novel copolymers based on the functionalized beta propiolactones with beta propiolactone or other monomers which copolymerize with the functionalized beta propiolactones.

14 Claims, No Drawings

(56) References Cited

OTHER PUBLICATIONS

Spassky, Nicolas, "Stereospecific and anionic ring-opening polymerization", Makromol. Chem., Macromol. Symp. vol. 42/43, Jan. 1, 1991, pp. 15-49. XP055869252.
Written Opinion of the International Preliminary Examining Authority for International Application PCT/US2021/045912 dated Aug. 8, 2022 (11 pages).

BETAPROPIOLACTONE AND FUNCTIONALIZED BETAPROPIOLACTONE BASED POLYMER SYSTEMS

CROSS-REFERENCE TO RELATED APPLICATIONS

This application is a National Stage 371 entry of PCT/US2021/045912 filed on Aug. 13, 2021, published as WO2022/040040, which claims priority to U.S. Provisional Patent Application No.: 63/066,451 filed on Aug. 17, 2020, all of which are incorporated herein by reference in their entirety for all purposes.

TECHNICAL FIELD

This disclosure relates to functionalized beta propiolactones and to polymer systems containing beta propiolactones and/or functionalized beta propiolactones and methods of preparing such systems. The polymer systems include cross-linked polymer systems and coatings and films prepared from such polymers.

BACKGROUND

Polymeric material, which includes polymers referred to as plastics, provide advantageous properties for several applications, including fabrication, design flexibility, ability to modify properties related to strength, flexibility, barrier properties and reducing the mass of structures fabricated from polymers. Polymers can be lighter than alternative materials and fabricated with less energy required than some alternative materials. Structures can be prepared from different types of polymers to adjust the properties and function of a structure to meet user needs, for instance multilayer films and coatings. Many polymers are prepared from fossil fuels which presents concerns in certain quarters. There are also concerns about how to dispose of polymeric materials after their useful life. Some polymeric materials do not readily decompose. Certain products utilizing polymers can be difficult to recycle, especially those products that utilize multiple types of polymers.

Polypropiolactones are polymers prepared from beta propiolactones, see US 2018/0094100, incorporated herein by reference. Polypropiolactones can be thermolyzed to form highly pure acrylic acid. Polypropiolactones are biodegradable to carbon dioxide and water. Polypropiolactones are prepared from beta propiolactone which can be optionally prepared from renewable resources, U.S. Pat. No. 10,669,373, incorporated herein by reference. Polypropiolactones can be prepared in highly pure form to maximize their properties. There is a demand for polymer systems which can have tailored functionality for certain uses.

What are needed are polymer systems with improved biodegradability and recyclability. What are needed are polymer systems that can have certain desired properties to meet user needs. What are needed are polymer systems that can be prepared in high purity and optionally from renewable resources. What are needed are monomers that prepare such systems. What are needed are beta propiolactones and polymers thereof which meet such needs.

SUMMARY

Disclosed herein are polymers, copolymers and polymer systems based on polypropiolactones which can be biodegradable and can enhance the recyclability of polymer systems and optionally prepared from renewable raw materials. Disclosed are novel functionalized beta propiolactones. Some of the novel functionalized beta propiolactones have functional groups bound to the ring structure of the lactone that provide improved polymer systems. Disclosed are polymer systems based on polypropiolactones and/or comprising novel functionalized beta propiolactones. Disclosed are novel homopolymers and novel copolymers of functionalized beta propiolactones. These copolymers may comprise functionalized beta propiolactones with beta propiolactone or other monomers which copolymerize with the functionalized beta propiolactones.

Disclosed are several novel polymer systems containing functionalized beta propiolactones and/or beta propiolactones. The functionalized beta propiolactones and/or beta propiolactones can be used as tie layers between polymeric layers wherein the polymeric layers can be based on the same polymers or based on different polymers. The different polymers may be incompatible with one another. The functionalized beta propiolactones and/or beta propiolactones may be used as adhesive layers to bind polymeric structures together or to other substrates. Polymers and copolymers of functionalized beta propiolactones and/or beta propiolactones may be used as coatings or free-standing films or in multilayer coatings or films. The functional groups may react with other monomer systems to form crosslinks between polymer layers or can polymerize into formed layers of other copolymers. The functionalized beta propiolactones and/or beta propiolactones may have functional groups that improve bonding of films or coatings to substrates.

The functional groups from the functionalized beta propiolactones may provide functionality to polymers and copolymers prepared from the functionalized beta propiolactones. The functional groups may function as polymerization initiators, improve adhesion of the polymers to certain substrates or polymer systems, improve the hydrophobic or hydrophilic properties, improve the hardness or scratch resistance, polymerization catalysts, and the like. Polymers and copolymers of functionalized beta propiolactones and/or beta propiolactones may function as intermediate layers in multilayer films, including such films having layers of different polymers. The polymers and copolymers of functionalized beta propiolactones and/or beta propiolactones decompose under certain conditions and allow the other layers to be easily separated for reuse on recycling. Polymers and copolymers of functionalized beta propiolactones and/or beta propiolactones may function as intermediate layer between coatings of other polymers and a substrate. The polymers and copolymers of functionalized beta propiolactones and/or beta propiolactones decompose under certain conditions and allow the substrate to be easily separated from the other coating layers for reuse in recycling. The polymers and copolymers of functionalized beta propiolactones and/or beta propiolactones can be used as the outside film layer or coating layer that can be decomposed or such outside layer can be functionalized to provide a desired set of properties to the structure.

Disclosed are functionalized beta-propiolactone having the general formula:

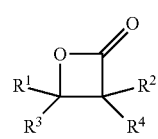

wherein $R^1$, $R^2$, $R^3$, $R^4$ are separately in each occurrence hydrogen, a hydrocarbyl moiety or a fluorocarbyl moiety; the hydrocarbyl or fluorocarbyl moieties may optionally contain at least one heteroatom or at least one substituent, wherein at least one $R^1$, $R^2$, $R^3$, $R^4$ are present as a hydrocarbyl or fluorocarbyl moiety. At least one $R^1$, $R^2$, $R^3$, $R^4$ may be present as a hydrocarbyl or fluorocarbyl moiety that enhances function of the functionalized beta-propiolactones incorporated into polymer chains useful in coatings or films. At least one $R^1$, $R^2$, $R^3$, $R^4$ that are hydrocarbyl or fluorocarbyl groups may contain one or more of unsaturated groups, electrophilic groups, nucleophilic groups, anionic groups, cationic groups, zwitterion containing groups, hydrophobic groups, hydrophilic groups, halogen atoms, natural minerals, synthetic minerals, carbon-based particles, an ultraviolet active group, a polymer having surfactant properties, and polymerization initiating or reactive heterocyclic rings. The functional groups may be linked to the ring by a linking group (L) which functions to link the functional portion of the groups to the cyclic ring. Exemplary linking groups may be hydrocarbylene, fluorocarbylene groups, ethers, thioethers, polyethers (such as polyalkylene ethers). One or more of $R^1$, $R^2$, $R^3$, $R^4$ may be a halogen substituted alkyl group, a sulfonic acid substituted alkyloxy group, an alkyl sulfonate alkyloxy group, an alkyl ether substituted alkyl group, a polyalkylene oxide substituted alkyl group, an alkyl ester substituted alkyl group, an alkenyloxy substituted alkyl group, an aryl ester substituted alkyl group, an alkenyl group; a cyano substituted alkyl group, an alkenyl ester substituted alkyl group, a cycloalkyl substituted alkyl group, an aryl group, a heteroatom containing cycloalkenyl group, alkyl ether substituted alkyl group, a hydroxyl substituted alkyl group, a cycloaliphatic substituted alkenyl group, an aryl substituted alkyl group, a haloaryl substituted alkyl group, an aryloxy substituted alkyl group, an alkyl ether substituted alkaryl group, a hetero atom containing cycloaliphatic group substituted alkyl group, a hetero atom containing aryl substituted alkyl group, an alkyl amide substituted alkyl group, an alkenyl substituted cycloaliphatic group, two of $R^1$ or $R^2$ and $R^3$ or $R^4$ may form a cyclic ring, which may optionally contain one or more unsaturated groups, an alkyl group substituted with a beta propiolactone group which may optionally be contain one or more ether groups and/or one or more hydroxyl groups;, a glycidyl ether group, or a benzocyclobutene substituted alkyl group, optionally substituted with one or more ether groups. Beta propiolactone corresponds to the formula wherein all of $R^1$, $R^2$, $R^3$ and $R^4$ are hydrogen.

Disclosed are homopolymers prepared from the one or more functionalized beta propiolactones described. Disclosed are copolymers of a beta propiolactone and one or more the functionalized beta propiolactones. Disclosed are compositions comprising a copolymer of one or more the functionalized beta propiolactones disclosed with one or more monomers reactive with the one or more functionalized beta propiolactones. Such copolymers include a plurality of one or more diols, difunctional poly alkyleneoxides, amine terminated polyalkylene oxides, one or more difunctional polyesters, cyclic lactones, cyclic anhydrides or polyethers. These copolymers may contain units derived from beta propiolactones. The copolymers disclosed may be block copolymers, random copolymers or one or more chains may be grafted to the polymer backbone.

Disclosed are compositions comprising a polymeric layer disposed on the layer of one or more functionalized beta-propiolactones or a polymer containing one or more functionalized beta-propiolactones. The one or more of the functional groups of the one or more functionalized beta-propiolactones or a polymer containing one or more functionalized beta-propiolactones may form a covalent bond or ionic bond with the polymeric species or upon ring opening of the lactone a bond between the ring opened structure and the polymeric species is formed.

Disclosed is a composition comprising a polymer having pendant electrophilic, nucleophilic or ionic groups bonded to one or more functionalized beta-propiolactones or a polymer containing one or more functionalized beta-propiolactones wherein the one or more functionalized beta-propiolactones or a polymer containing one or more functionalized beta-propiolactones are bonded to the polymer through the pendant electrophilic, nucleophilic or ionic groups. Disclosed is a composition comprising a layer of one or more functionalized beta-propiolactones or a polymer containing one or more functionalized beta-propiolactones as disclosed herein wherein the functionalized beta-propiolactones have one or more pendant groups which are polymerizable by anionic polymerization, cationic polymerization, condensation polymerization, radical polymerization, ring opening metathesis, contact with zwitterions, and a layer of a polymer that polymerizes by anionic polymerization, cationic polymerization, condensation polymerization, addition polymerization, contact with a ring opened structure or contact with zwitterions, wherein the one of more of the pendant groups polymerize with the polymer that polymerizes by anionic polymerization, cationic polymerization, condensation polymerization, radical polymerization, ring opening metathesis, by contact with zwitterions and covalently bond the two layers together. Disclosed is a polymer prepared from a plurality of units derived from one or more of the beta-propiolactones disclosed herein having pendant from the backbone a functional group which has further bonded thereto one or more pigments, groups capable of photo initiating polymerization, one or more minerals, groups capable of absorbing radiation, or one or more materials that improve the hardness of a polymer.

Disclosed is a composition comprising a substrate, a layer of one or more of beta-propiolactones and functionalized beta-propiolactones or a polymer containing one or more of beta-propiolactones and/or functionalized beta-propiolactones disposed on the substrate. Disclosed is a composition wherein one or more of the functional groups of the one or more functionalized beta-propiolactones or a polymer containing one or more functionalized beta-propiolactones form a covalent bond or ionic bond with the surface of the substrate. Disposed on the layer of the one or more of beta-propiolactones and functionalized beta-propiolactones or a polymer containing one or more of beta-propiolactones and/or functionalized beta-propiolactones may be a layer of a different polymer. The functionalized beta-propiolactones or a polymer containing one or more of beta-propiolactones and/or functionalized beta-propiolactones may have pendant groups which form a covalent bond, ionic bond, polymerize with the different polymer or which initiate polymerization of the different polymer.

Disclosed herein are coatings and films prepared from the disclosed compositions. Disclosed is a composition comprising a substrate, a layer of one or more of beta-propiolactone and functionalized beta-propiolactones or a polymer containing one or more of beta-propiolactones and functionalized beta-propiolactones disposed on the substrate. Disclosed is a composition comprising a substrate coated with a polymer layer having disposed on the polymer layer a polymer containing one or more beta propiolactones, functionalized beta-propiolactones or a polymer containing one or more functionalized beta-propiolactones. A multilayer film prepared from one or more polymeric layers having on at least one outer layer a polymer containing one or more beta propiolactones, functionalized beta-propiolactones or a polymer containing one or more functionalized beta-propiolactones. A composition comprising two or more layers of different polymers having between each of the layers a layer of a polymer containing one or more beta propiolactones, functionalized beta-propiolactones or a polymer containing one or more functionalized beta-propiolactones is disclosed.

Polymer systems and multilayer structures containing beta propiolactones, functionalized beta-propiolactones or a polymer containing one or more functionalized beta-propiolactones exhibit a number of significant advantages including the use of biodegradable materials which can enhance disposal and recyclability, functionalization of layers to enhance to function of the formed structures and optionally utilizing a significant amount of raw materials from renewable resources.

DETAILED DESCRIPTION

Residue with respect to an ingredient or reactant used to prepare the polymers or structures disclosed herein means that portion of the ingredient that remains in the polymers or structures after inclusion as a result of the methods disclosed herein. Substantially all as used herein means that greater than 90 percent of the referenced parameter, composition, structure or compound meet the defined criteria, greater than 95 percent of the referenced parameter, composition or compound meet the defined criteria, greater than 99 percent of the referenced parameter, composition or compound meet the defined criteria, or greater than 99.5 percent of the referenced parameter, composition or compound meet the defined criteria. One or more as used herein means that at least one, or more than one, of the recited components may be used as disclosed. Heteroatom refers to atoms that are not carbon or hydrogen such as nitrogen, oxygen, sulfur, a halogen, silicon and phosphorus. Hydrocarbyl means a group containing one or more carbon atom chains and hydrogen atoms, which may optionally contain one or more heteroatoms. Fluorocarbyl means a group containing one or more carbon atom chains and fluorine atoms, which may optionally contain one or more heteroatoms. Where a hydrocarbyl or fluorocarbyl group contains heteroatoms, the heteroatoms may form one or more functional groups well-known to one skilled in the art. A group containing carbon chains and both hydrogen atoms and fluorine atoms may be referred to as a hydrocarbyl group having containing heteroatoms of which a portion may be a halogen, such as fluorine. Hydrocarbyl groups may contain cycloaliphatic, aliphatic, aromatic, or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl, and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. Alkyl as used herein refers to straight and branched chain alkyl groups. Percent by weight or parts by weight refer to, or are based on, the weight or the compounds or compositions described unless otherwise specified. Fluorocarbylene means a fluorocarbyl group or any of the described subsets having more than one valence. Unless otherwise stated parts by weight are based 100 parts of the composition.

The term isocyanate-reactive compound or group as used herein includes any organic compound or group having nominally greater than one, or at least two, isocyanate-reactive moieties. An active hydrogen containing moiety refers to a moiety containing a hydrogen atom which, because of its position in the molecule, displays significant activity according to the Zerewitinoff determination described by Wohler in the Journal of the American Chemical Society, Vol. 49, p. 3181 (1927). Illustrative of such isocyanate reactive moieties, such as active hydrogen moieties, are —COOH, —OH, —NH$_2$, —NH—, —CONH$_2$, —SH, and —CONH—. Initiator means a group or compound that initiates a reaction and related to polymerization initiates a polymerization reaction. Anionic polymerization is a type of chain growth polymerization in which an anionic initiator transfers a charge to an unsaturated monomer, such as a vinyl monomer which then becomes reactive. Each reactive monomer may react with other monomers to form a linear polymer. An anionic initiator under polymerization conditions forms an anion which is a group which has at least one extra electron which makes the group nucleophilic. Anionic polymerization is often referred to living polymerization because the polymerization will continue as long as there are nucleophiles present to react with or until a quenching agent is added to react with the anionic groups present. Radical polymerization means polymerization initiated and propagated by the initiation of carbon radicals. Cationic initiators are compounds that can convert to electrophiles, positively charged species. Cationic polymerization is a type of chain growth polymerization in which a cationic initiator transfers a proton to a monomer which then becomes reactive toward chain growth. Ring opening metathesis polymerization is a polymerization reaction wherein a compound or group having a strained ring and unsaturation is contacted with an alkylidene catalyst to open the ring and generate an unsaturated group which further polymerizes.

The disclosed polymer systems and structures may contain functionalized beta propiolactones and optionally propiolactone. Some of the functionalized beta propiolactones may be novel. The functionalized beta propiolactones may have functional groups which enhance the function of the functionalized beta propiolactones or polymers containing them in polymer base structures, coatings and film applications. The functional groups may be one or more hydrocarbyl moieties and/or a fluorocarbyl moieties; which may contain at least one heteroatom or at least one substituent. The functional groups may be one or more of hydrocarbyl or fluorocarbyl groups that contain one or more of unsaturated groups, electrophilic groups, nucleophilic groups, anionic groups, cationic groups, zwitterions, hydrophobic groups, hydrophilic groups, halogen atoms, natural minerals, synthetic minerals, carbon-based particles, an ultraviolet active group, a polymer having surfactant properties, and polymerization initiators. The functional groups may be one or more of a fluorocarbyl, aryl, substituted aryl, cycloaliphatic, substituted cycloaliphatic, aliphatic or substituted aliphatic moiety. The functional groups may be one or more of alkyl, alkenyl, cycloalkyl, heterocyclyl, alkyl heterocyclyl, aryl, aralkyl, alkaryl, heteroaryl, or alkyl heteroaryl, or polyoxyalkylene groups, or a 5-20 membered cyclic or heterocyclic ring fused to the beta propiolactone ring. The functional groups may be one or more of $C_1$-$C_{15}$ alkyl, $C_2$-$C_{15}$ alkenyl, $C_3$-$C_9$ cycloalkyl, $C_2$-$C_{20}$ heterocyclyl, $C_3$-$C_{20}$ alkyl heterocyclyl, $C_6$-$C_{18}$ aryl, $C_7$-$C_{25}$ alkaryl, $C_7$-$C_{25}$ aralkyl, $C_5$-$C_{18}$ heteroaryl or $C_6$-$C_{25}$ alkyl heteroaryl, or polyoxyalkylene groups. The functional groups may be one or more of a halogen substituted alkyl group, a sulfonic acid substituted alkyloxy group, an alkyl sulfonate alkyloxy group, alkyl ether substituted alkyl group, a polyalkylene oxide substituted alkyl group, an alkyl ester substituted alkyl group, an alkenyloxy substituted alkyl group, an aryl ester substituted alkyl group, an alkenyl group, a cyano substituted alkyl group, an alkenyl ester substituted alkyl group, a cycloalkyl substituted alkyl group,; an aryl group, a heteroatom containing cycloalkenyl alkyl ether substituted alkyl group, a hydroxyl substituted alkyl group, a cycloaliphatic substituted alkenyl group, an aryl substituted alkyl group, a haloaryl substituted alkyl group, an aryloxy substituted alkyl group, an alkyl ether substituted alkaryl group, a hetero atom containing cycloaliphatic group substituted alkyl group, an alkyl amide substituted alkyl group, an alkenyl substituted cycloaliphatic group,; or a fused cyclic ring which may optionally contain one or more unsaturated groups, an alkyl group substituted with a beta propiolactone group which may optionally be contain one or more ether groups and/or one or more hydroxyl groups, a glycidyl ether group, or a benzocyclobutene substituted alkyl group, optionally substituted with one or more ether groups. The functional groups may have substituents on them. The substituents may be a halo, a poly tetrafluoro alkene, alkylthio, alkoxy, hydroxyl, nitro, azido, cyano, acyloxy, carboxy, ester, polyalkylene oxide, unsaturated groups, natural mineral, synthetic mineral, or carbon-based structure. The functional groups may be linked to the ring by a linking group (L) which functions to link the functional portion of the groups to the cyclic ring. Exemplary linking groups may be hydrocarbylene, fluorocarbylene groups, ethers, thioethers and polyethers (such as polyalkylene ether).

The functionalized beta-propiolactones may correspond to formula 1:

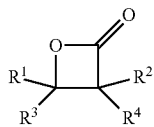

wherein $R^1$, $R^2$, $R^3$, $R^4$ are separately in each occurrence hydrogen, a hydrocarbyl moiety or a fluorocarbyl moiety; the hydrocarbyl moiety or fluorocarbyl moiety may optionally contain at least one heteroatom or at least one substituent, wherein at least one of $R^1$, $R^2$, $R^3$, $R^4$ are present as a hydrocarbyl or fluorocarbyl moiety. At least one of $R^1$, $R^2$, $R^3$, $R^4$ may be present as a hydrocarbyl or fluorocarbyl moiety that enhances function of the functionalized beta-propiolactones incorporated into polymer chains useful in coatings or films. At least one of $R^1$, $R^2$, $R^3$, $R^4$ may be hydrocarbyl or fluorocarbyl groups that contain one or more of unsaturated groups, electrophilic groups, nucleophilic groups, anionic groups, cationic groups, zwitterions, hydrophobic groups, hydrophilic groups, halogen atoms, natural minerals, synthetic minerals, carbon-based particles, an ultraviolet active group, a polymer having surfactant properties, and polymerization initiators. $R^1$, $R^2$, $R^3$, $R^4$ may be separately in each occurrence hydrogen, a fluorocarbyl, aryl, substituted aryl, cycloaliphatic, substituted cycloaliphatic, aliphatic or substituted aliphatic moiety. $R^1$, $R^2$, $R^3$, $R^4$ may separately in each occurrence are hydrogen, alkyl, alkenyl, cycloalkyl, heterocyclyl, alkyl heterocyclyl, aryl, aralkyl, alkaryl, heteroaryl, or alkyl heteroaryl, or polyoxyalkylene, or two of $R^1$, $R^2$, $R^3$, $R^4$ may form a 5-20 membered cyclic or heterocyclic ring. $R^1$, $R^2$, $R^3$, $R^4$ may be separately in each occurrence $C_1$-$C_{15}$ alkyl, $C_2$-$C_{15}$ alkenyl, $C_3$-$C_9$ cycloalkyl, $C_2$-$C_{20}$ heterocyclyl, $C_3$-$C_{20}$ alkyl heterocyclyl, $C_6$-$C_{18}$ aryl, $C_7$-$C_{25}$ alkaryl, $C_7$-$C_{25}$ aralkyl, $C_5$-$C_{18}$ heteroaryl or $C_6$-$C_{25}$ alkyl heteroaryl, or polyoxyalkylene. $R^1$, $R^2$, $R^3$, $R^4$ may be separately in each occurrence a halogen substituted alkyl group, a sulfonic acid substituted alkyloxy group, an alkyl sulfonate alkyloxy group, alkyl ether substituted alkyl group, a polyalkylene oxide substituted alkyl group, an alkyl ester substituted alkyl group, an alkenyloxy substituted alkyl group, an aryl ester substituted alkyl group, an alkenyl group, a cyano substituted alkyl group, an alkenyl ester substituted alkyl group, a cycloalkyl substituted alkyl group, an aryl group, a heteroatom containing cycloalkenyl alkyl ether substituted alkyl group, a hydroxyl substituted alkyl group, a cycloaliphatic substituted alkenyl group, an aryl substituted alkyl group, a haloaryl substituted alkyl group, an aryloxy substituted alkyl group, an alkyl ether substituted alkaryl group, a hetero atom containing cycloaliphatic group substituted alkyl group, an alkyl amide substituted alkyl group, an alkenyl substituted cycloaliphatic group, two of $R^1$ or $R^2$ and $R^3$ or $R^4$ form a cyclic ring, which may optionally contain one or more unsaturated groups, an alkyl group substituted with a beta propiolactone group which may optionally contain one or more ether groups and/or one or more hydroxyl groups; a glycidyl ether group, or a benzocyclobutene substituted alkyl group, optionally substituted with one or more ether groups. $R^1$ may be a heterocycle that is polymerizable, such as an oxazoline. $R^1$, $R^2$, $R^3$, $R^4$ may be separately in each occurrence one of the functional groups disclosed linked by a linking group L to the cyclic ring. The functionalized beta-propiolactones may correspond to the general formula to one of formulas 2 to 6;

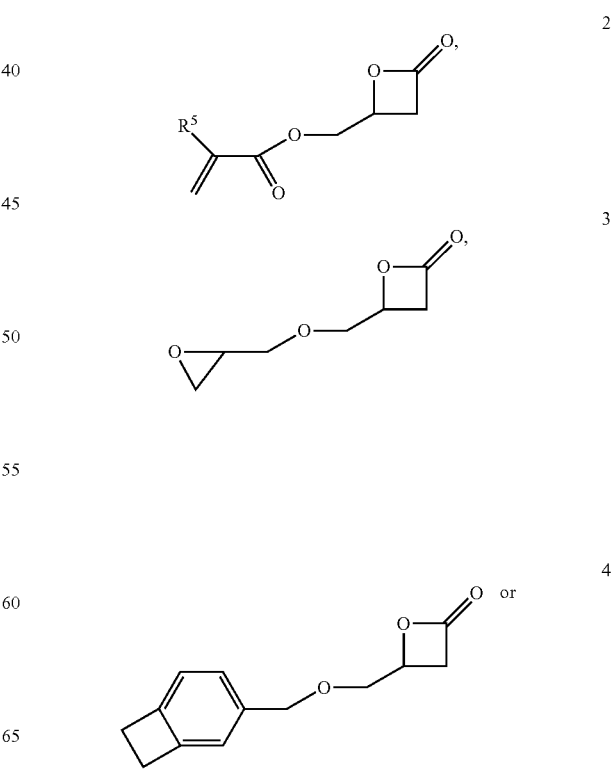

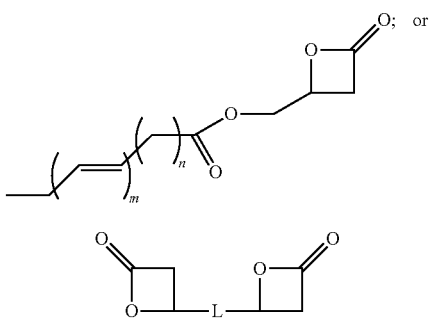

wherein m and n are independently integers of 1 or more, with the proviso that where m, n or both are greater than 1 and L is independently in each occurrence a linking group. A linking group may be any bi valent group that can link propiolactone groups. L may be separately in each occurrence a hydocarbylene group, optionally substitutes with a substituent as disclosed in this application. L may be an alkylene group or a polyoxyalkylene group. $R^5$ is separately in each occurrence hydrogen or an alkyl group, such as a $C_{1-4}$ alkyl group or methyl. The units in parenthesis may be arranged in any manner. Beta-propiolactone corresponds to Formula 1 wherein all of $R^1$, $R^2$, $R^3$ and $R^4$ are hydrogen.

A number of the functionalized beta propiolactones are disclosed, see commonly owned application PCT/US2020/020317 pages 22 to 31, incorporated herein by reference. Such compounds may be prepared by reacting an epoxide substituted with the desired functional groups with carbon monoxide as disclosed in the above-mentioned applications. The reaction may be conducted at a temperature of about 0° C. or greater, about 25° C. or greater or about 50° C. or greater to about 150° C. or less. Alternatively, one of the known beta propiolactones or functionalized beta propiolactones may converted to the desired compounds according to known organic synthetic processes. In the copolymers the ratio of functionalized beta propiolactones to beta propiolactones is chosen to provide the desired functionality in the formed copolymers as described herein.

Homopolymers prepared from one or more functionalized beta propiolactone or beta propiolactone and copolymers of a beta propiolactone and one or more functionalized beta propiolactone may be prepared by the process as disclosed in US Application 2018/0094100 incorporated herein by reference in its entirety for all purposes. The homopolymers and copolymers may be prepared by contacting one or more functionalized beta propiolactone and/or beta propiolactones with a solid carboxylate catalyst or acrylic acid catalyst. The reaction may be conducted at least partially in the gas phase or in the liquid phase.

Disclosed are copolymers of one or more functionalized beta propiolactone and/or beta propiolactone with one or more monomers reactive with the one or more functionalized beta propiolactones and/or beta propiolactones. The one or more monomers reactive with the one or more functionalized beta propiolactones and/or beta propiolactones include one or more diols, difunctional poly alkyleneoxides, amine terminated polyalkylene oxides, one or more difunctional polyesters, cyclic lactones, cyclic anhydrides or polyethers. The co-monomer may be one or more lactones and/or anhydrides. The co-monomer may be a cyclic anhydride, for example succinic anhydride or maleic anhydride, Exemplary functional beta propiolactones that may be used in these copolymers may be beta-butyrolactone, beta-valerolactone, beta-heptanolactone, beta-tridecanolactone, cis-3, 4-dimethyloxetan-2-one, 4-(butoxymethyl)-2-oxetanone, 4-[[[(1,1-dimethylethyl)dimethylsilyl]oxy]methyl]-2-oxetanone, 4-[(2-propen-1-yloxy)methyl]-2-oxetanone, or 4-[(benzoyloxy)methyl]-2-oxetanone. These copolymers may be prepared according to the processes disclosed in commonly owned patent U.S. Pat. No. 10,669,373 incorporated herein by reference in its' entirety for all purposes.

Co-polymerization of beta-lactones and cyclic anhydrides may be performed in the presence of polymerization initiator. The polymerization initiator initiates the ring opening polymerization of beta-lactones and cyclic anhydrides to produce co-polymers. A broad range of polymerization catalysts can be used for the initiation of the ring opening polymerization. The polymerization initiator may be an ionic initiator. The ionic initiator may have the general formula of M"X where M" is cationic and X is anionic. M" may be selected from the group consisting of Li+, Na+, K+, Mg2+, Ca2+, and Al3+. M" may be Na+. M" may be an organic cation. The organic cation may be quaternary ammonium, imidazolium, and bis(triphenylphosphine)iminium. The quaternary ammonium cation may be tetraalkyl ammonium. X may be a nucleophilic anion, for example compounds comprising at least one carboxylate group, at least one alkoxide group, at least one phenoxide group, and any combination thereof. The nucleophilic anion is may be one or more halides, hydroxide, alkoxide, carboxylate, and any combination thereof. The ionic initiator may be sodium acrylate or tetrabutylammonium acrylate. The polymerization may be performed in the presence of one or more solvents. Exemplary solvents for the polymerization with cyclic anhydride monomers include methylene chloride, chloroform, tetrahydrofuran, sulfolane, N-methyl pyrrolidone, diglyme, triglyme, tetraglyme, and dibasic esters.

The co-polymers may be produced by reacting beta-propiolactone and/or one or more functionalized beta propiolactones with an alcohol comprising at least two hydroxyl groups. Although, applicants are not bound to any theory as to how such co-polymers are prepared, beta-propiolactone and/or one or more functionalized beta propiolactones may react with the alcohol to form a carboxylic acid comprising at least two carboxylic acid groups. The carboxylic acids formed having at least two carboxylic acid groups may further react with the alcohol having at least two hydroxyl groups by condensation polymerization to produce the co-polymers. Exemplary diols include ethylene glycol, 1,2-propylene glycol, 1,3-propylene glycol, 1,4-butanediol, diethylene glycol, bis(hydroxymethyl)octadecanol and 1,6-hexanediol. The process may be performed in the presence of one or more solvents, for example toluene, xylene and mesitylene.

Disclosed are structures and polymer systems based on based on polypropiolactones, functionalized polypropiolactones, copolymers of beta propiolactones and/or functionalized beta propiolactones. The structures may comprise films thereof. The films may comprise one or more layers of the polypropiolactones, functionalized polypropiolactone and, copolymers containing beta propiolactones and/or functionalized beta propiolactones. The multilayer structures may further comprise layers of thermoplastic or thermoset polymers. The multilayer structures may have one or more of each polymer layer which may be arranged in any arrangement of layers. Exemplary thermoplastic layers include polyolefins, polyacrylates, styrene-based polymers and copolymers, methylene malonates, polyamides, polyesters and thermoplastic polyurethanes. Exemplary thermoset layers include polyurethanes and polyepoxides. A layer of one or more layers of the polypropiolactones, functionalized polypropiolactones, copolymers containing beta propiolactones and/or functionalized beta propiolactones may be disposed between two or more layers of other polymers. This structure may be advantageous where the other polymer layers are different polymers as the layer of one or more layers of the polypropiolactones, functionalized polypropiolactones, copolymers containing beta propiolactones and/or functionalized beta propiolactones can be decomposed, biodegrade, and the other layers can be separated from one another to facilitate reuse or recycling.

Disclosed are structures comprising a coating applied to substrates wherein at least a portion of the coatings may be derived from one or more layers of the polypropiolactones, functionalized polypropiolactones, copolymers of beta propiolactones and/or functionalized beta propiolactones, copolymers of beta propiolactones and/or functionalized beta propiolactones and other monomers which copolymerize with beta propiolactones and/or functionalized beta propiolactones. The coatings may have multiple layers wherein one or more layers are prepared from other polymer systems. A layer comprising the polypropiolactones, functionalized polypropiolactones, copolymers of beta propiolactones and/ or functionalized beta propiolactones and optionally other monomers which copolymerize with beta propiolactones and/or functionalized beta propiolactones may be directly applied to the substrate with layers of other polymers applied on the layer of the polypropiolactones, functionalized polypropiolactones, and copolymers containing beta propiolactones and/or functionalized beta propiolactones. The layer of polypropiolactones, functionalized polypropiolactones, copolymers containing beta propiolactones and/or functionalized beta propiolactones can be decomposed or biodegrade and the other layers can be separated from the substrate to facilitate reuse or recycling of the substrate. A layer of a homopolymer of polypropiolactones, functionalized polypropiolactones or one or more copolymers containing functionalized beta propiolactones and/or beta propiolactones can be disposed on the outer surface of a coating or as the outer layer of a multilayer film to functionalize the surface as a result of the functional groups on the functionalized beta propiolactones. The surfaces may be functionalized for any desired purpose, including adjusting the hydrophilic nature, hydrophobic nature, hardness, scratch resistance, microbial resistance, adhesion to other components, and the like.

The functionalized beta propiolactones or polymers containing the functionalized beta propiolactones may have functional groups with react with functional groups on other polymer systems to bond with the other polymers, which initiate polymerization of monomers to form polymeric layers of other polymers, may have reactive groups that react with other monomers and become part of other polymeric layer.

The functionalized beta propiolactones or polymers containing the functionalized beta propiolactones may have functional groups containing one or more active hydrogen atoms which may crosslink with unreacted isocyanate groups of polyurethane or polyurea based prepolymers. Alternatively, such active hydrogen containing functional groups may react with polyisocyanates and compounds having two or more active hydrogen containing groups in the presence of a tertiary amine and/or tin II or IV carboxylate catalyst at elevated temperatures to form a polyurea or polyurethane layer.

The functionalized beta propiolactones or polymers containing the functionalized beta propiolactones may have functional groups containing one or more double or triple bonds, such double or triple bonds may be at the end of carbon chains. The double or triple bonds may be reacted with other monomers having unsaturation to form an addition polymer. The double or triple bonds may react with the other monomers by anionic, cationic or radical polymerization depending on the nature of the other monomers. If the monomers have unsaturated groups which are nucleophilic such as cyanoacrylates or methylene malonates, anionic polymerization maybe utilized. Anionic polymerization may be initiated by contacting the monomers with a base, such as tetramethyl guanidine. Basic catalysts initiate anionic polymerization where the reactive monomers contain nucleophilic double bonds. Other unsaturated compounds may be polymerized by anionic polymerization but the conditions require aggressive initiators such as sec-butyl lithium and very low reaction temperatures around −80° C. Styrenics and conjugated dienes anionically polymerize under these conditions.

If the unsaturated compounds are olefins, styrenic, (meth) acrylates, unsaturated nitriles, conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI), and the like, then the functionalized beta propiolactones or polymers containing the functionalized beta propiolactones may have functional groups containing one or more double or triple bonds which may be reacted with such compounds to form polymeric layers by radical polymerization. The monomers are contacted with a radical initiator, such as a peroxide or azo compound, under conditions such that radical polymerization may proceed.

The unsaturated groups of functionalized beta propiolactones or polymers thereof may copolymerize with certain unsaturated compounds via cationic polymerization. For example comonomers having vinyl groups with electron releasing groups such as alkoxy, phenyl or alkyl groups polymerize by cationic polymerization, examples are styrene and substituted styrene. Cationic polymerization requires the use of a Lewis acid, such as trifluoro borane or a strong protonic acid such as sulfuric acid, phosphoric acid and hydrochloric acid in the presence of a Lewis base such as water, an alcohol or acetic acid. The catalyst induces the monomers to form cationic species which function as electrophiles which add to unsaturated groups and form another electrophile. This continues until most of the monomers add to the polymer chains or the reaction is quenched.

Where the functionalized beta propiolactones or polymers containing the functionalized beta propiolactones contain functional groups that have strained rings and unsaturated groups, such groups can polymerize with unsaturated compounds by ring opening metathesis which is catalyzed by an alkylidene catalyst.

The functionalized beta propiolactones or polymers containing the functionalized beta propiolactones may have functional groups that are nucleophilic which will react with polymers having electrophilic groups pendant from their chains and form crosslinks between their respective layers. The functionalized beta propiolactones or polymers containing the functionalized beta propiolactones may have functional groups that are electrophilic which will react with polymers having nucleophilic groups pendant from their chains and form crosslinks between their respective layers. Exemplary nucleophilic groups include hydroxyl, carboxylic acids, amines, benzoic acids, sulfonates, and sulfates and the like. The acids become nucleophilic when at least partially neutralized. Consequently, the acids are nucleophilic when fully neutralized or are deprotonated. The electrophilic groups may be one or more of epoxide, anhydride, imide, ester, acyl halide, acyl nitrile, aldehyde, ketone, isocyanate, and isothiocyanate groups or mixtures thereof. The electrophilic groups may be epoxide groups.

EMBODIMENTS

1. A polymer comprising one or more functionalized beta-propiolactones having the general formula:

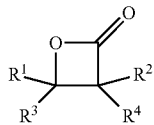

wherein independently in each occurrence $R^1$, $R^2$, $R^3$, $R^4$ are separately in each occurrence hydrogen, a hydrocarbyl moiety or a fluorocarbyl moiety; the hydrocarbyl moiety or fluorocarbyl moiety may optionally contain at least one heteroatom or at least one substituent, wherein at least one $R^1$, $R^2$, $R^3$, $R^4$ are present as a hydrocarbyl or flourocarbyl moiety.

2. The polymer of Embodiment 1, wherein at least one R1, R2, R3, R4 are present as a hydrocarbyl or fluorocarbyl moiety that enhances function of the functionalized beta-propiolactones incorporated into polymer chains useful in coatings or films.

3. The polymer comprising one or more functionalized beta-propiolactone of Embodiment 1 or 2 wherein at least one $R^1$, $R^2$, $R^3$, $R^4$ are hydrocarbyl or fluorocarbyl groups that contain one or more of unsaturated groups, electrophilic groups, nucleophilic groups, anionic groups, cationic groups, zwitterions, hydrophobic groups, hydrophilic groups, halogen atoms, natural minerals, synthetic minerals, carbon based particles, an ultraviolet active group, a polymer having surfactant properties, and polymerization initiators,.

4. The polymer comprising one or more functionalized beta-propiolactone of any one of the preceding Embodiments wherein $R^1$, $R^2$, $R^3$, $R^4$ are separately in each occurrence hydrogen, a fluorocarbyl, aryl, substituted aryl, cycloaliphatic, substituted cycloaliphatic, aliphatic or substituted aliphatic moiety.

5. The polymer comprising one or more functionalized beta-propiolactone of any one of the preceding Embodiments wherein $R^1$, $R^2$, $R^3$, $R^4$ are separately in each occurrence are hydrogen, alkyl, alkenyl, cycloalkyl, heterocyclyl, alkyl heterocyclyl, aryl, aralkyl, alkaryl, heteroaryl, or alkyl heteroaryl, or polyoxyalkylene, or two of $R^1$, $R^2$, $R^3$, $R^4$ may form a 5-20 membered cyclic or heterocyclic ring: or $R^1$, $R^2$, $R^3$, $R^4$ may be separately in each occurrence $C_1$-$C_{15}$ alkyl, $C_2$-$C_{15}$ alkenyl, $C_3$-$C_9$ cycloalkyl, $C_2$-$C_{20}$ heterocyclyl, $C_3$-$C_{20}$ alkyl heterocyclyl, $C_6$-$C_{18}$ aryl, $C_7$-$C_{25}$ alkaryl, $C_7$-$C_{25}$ aralkyl, $C_5$-$C_{18}$ heteroaryl or $C_6$-$C_{25}$ alkyl heteroaryl, or polyoxyalkylene; or a linking group (L) which functions to link the functional portion of the groups to the cyclic ring.

6. The polymer comprising one or more functionalized beta-propiolactones of any one of the preceding Embodiments wherein the substituent is halo, a poly tetrafluoro alkene, alkylthio, alkoxy, hydroxyl, nitro, azido, cyano, acyloxy, carboxy, ester, polyalkylene oxide, unsaturated groups, natural mineral, synthetic mineral, or a carbon-based structure.

7. The polymer comprising one or more functionalized beta-propiolactones of any one of the preceding Embodiments wherein one or more of $R^1$, $R^2$, $R^3$, $R^4$ is a halogen substituted alkyl group, a sulfonic acid substituted alkyloxy group;, an alkyl sulfonate alkyloxy group;, alkyl ether substituted alkyl group, a polyalkylene oxide substituted alkyl group, an alkyl ester substituted alkyl group, an alkenyloxy substituted alkyl group, an aryl ester substituted alkyl group, an alkenyl group, a cyano substituted alkyl group, an alkenyl ester substituted alkyl group, a cycloalkyl substituted alkyl group, an aryl group, a heteroatom containing cycloalkenyl alkyl ether substituted alkyl group, a hydroxyl substituted alkyl group, a cycloaliphatic substituted alkenyl group, an aryl substituted alkyl group, a haloaryl substituted alkyl group, an aryloxy substituted alkyl group, an alkyl ether substituted alkaryl group, a hetero atom containing cycloaliphatic group substituted alkyl group, an alkyl amide substituted alkyl group, an alkenyl substituted cycloaliphatic group, two of $R^1$ or $R^2$ and $R^3$ or $R^4$ form a cyclic ring, which may optionally contain one or more unsaturated groups; an alkyl group substituted with a beta propiolactone group which may optionally be contain one or more ether groups and/or one or more hydroxyl groups, a glycidyl ether group,_ or a benzocyclobutene substituted alkyl group, optionally substituted with one or more ether groups, and optionally a linking group (L) which functions to link the functional portion of the groups to the cyclic ring.

8. The polymer comprising one or more functionalized beta-propiolactone of any one of the preceding Embodiments wherein $R^1$ is a heterocycle that is polymerizable, such as an oxazoline, or corresponds to one of the formulas;

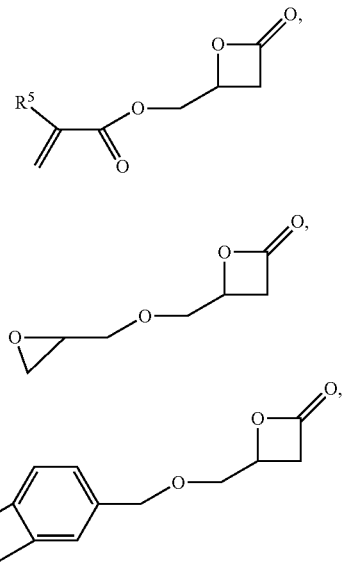

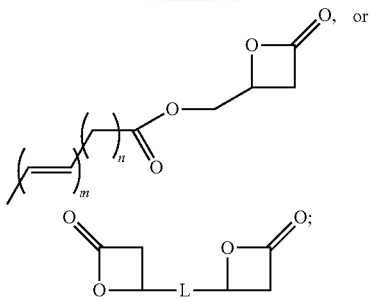

wherein m and n are independently integers of 1 or more, with the proviso that where m, n or both are greater than 1 and the units in parenthesis may be arranged in any manner; $R^5$ is hydrogen or an alkyl group; and
L is a linking group.

9. A homopolymer prepared from one or more of the functionalized beta propiolactones of any one of the preceding Embodiments.

10. A copolymer of a beta propiolactone and one or more functionalized beta propiolactone of any one of the preceding Embodiments.

11. A composition comprising a polymeric layer is disposed on the layer of one or more functionalized beta-propiolactones or a polymer containing one or more functionalized beta-propiolactones of Embodiment 9 or 10.

12. A composition according to Embodiment 11 wherein one or more of the functional groups of the one or more functionalized beta-propiolactones or a polymer containing one or more functionalized beta-propiolactones form a covalent bond or ionic bond with the polymeric species or upon ring opening of the lactone a bond between the ring opened structure and the polymeric species is formed.

13. A composition comprising a copolymer of one or more functionalized beta propiolactones of any one of Embodiments 1 to 8 with one or more monomers reactive with the one or more functionalized beta propiolactones.

14. A copolymer according to Embodiment 13 comprising a plurality of units derived from one or more of the beta-propiolactone and a plurality of one or more diols, difunctional poly alkyleneoxides, amine terminated polyalkylene oxides, one or more difunctional polyesters, cyclic lactones, cyclic anhydrides or polyethers.

15. A copolymer of Embodiment 13 or 14 wherein the copolymer is a block copolymer, random copolymer or one or more chains are grafted to the polymer backbone.

16. A composition comprising a polymer having pendant electrophilic, nucleophilic or ionic groups bonded to one or more functionalized beta-propiolactones or a polymer containing one or more functionalized beta-propiolactones having pendant electrophilic, nucleophilic or ionic groups of any one of Embodiments 1 to 8 bonded to the polymer through the pendant electrophilic, nucleophilic or ionic groups.

17. A composition comprising a layer of one or more functionalized beta-propiolactones or a polymer containing one or more functionalized beta-propiolactones according to any one of Embodiments 1 to 8 wherein the functionalized beta-propiolactones have one or more pendant groups which are polymerizable by anionic polymerization, cationic polymerization, condensation polymerization, radical polymerization, ring opening metathesis, zwitterions, and a layer of a polymer that polymerizes by anionic polymerization, cationic polymerization, condensation polymerization, addition polymerization, wherein the one of more of the pendant groups polymerize with the polymer that polymerizes by anionic polymerization, cationic polymerization, condensation polymerization, radical polymerization, ring opening metathesis and covalently bond the two layers together.

18. A polymer prepared from a plurality of units derived from one or more of the beta-propiolactones of any one of Embodiments 1 to 8 having pendant from the backbone a functional group which has further bonded thereto one or more pigments, groups capable of photoinitiating polymerization, one or more minerals, groups capable of absorbing radiation or one or more materials that improve the hardness of a polymer,.

19. A coating prepared from any one of the compositions described in Embodiments 1 to 18.

20. A film prepared from any one of the compositions according to Embodiments 1 to 18.

21. A multilayer polymeric structure comprising separate layers of two incompatible polymers with one or more of beta-propiolactones, functionalized beta-propiolactones or a polymer containing one or more of betapriopiolactone and functionalized beta-propiolactones according to any one of Embodiments 1 to 8 disposed between the layers.

22. A composition comprising a substrate, a layer of one or more of beta-propiolactones and functionalized beta-propiolactones or a polymer containing one or more of beta-propiolactones and/or functionalized beta-propiolactones of any one of the preceding Embodiments disposed on the substrate.

23. A composition according to Embodiment 22 wherein one or more of the functional groups of the one or more functionalized beta-propiolactones or a polymer containing one or more functionalized beta-propiolactones form a covalent bond or ionic bond with the surface of the substrate.

24. A composition according to Embodiment 22 or 23 wherein disposed on the layer of one or more of beta-propiolactones and functionalized beta-propiolactones or a polymer containing one or more of beta-propiolactones and/or functionalized beta-propiolactones is a layer of a different polymer.

25. A composition according to Embodiment 24 wherein functionalized beta-propiolactones or a polymer containing one or more of beta-propiolactones and/or functionalized beta-propiolactones have pendant groups which form a covalent bond, ionic bond, polymerize with the different polymer or which intiateinitiate polymerization of the different polymer.

26. A composition comprising a substrate coated with a polymer layer having disposed on the polymer layer a polymer according to any one of Embodiments 9 to 18.

27. A multilayer film prepared from one or more polymeric layers having on at least one outer layer a polymer according to anyone of Embodiments 9 to 18.

28. A composition comprising two or more layers of different polymers having between each of the layers a layer of any one of Embodiments 9 to 18

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A composition comprising a polymeric layer disposed on a layer of a homopolymer of one or more functionalized beta-propiolactones or copolymer containing one or more functionalized beta-propiolactones and beta-propiolactone; wherein the homopolymers and copolymers are polypropiolactones and the functionalized beta-propiolactones correspond to the formula:

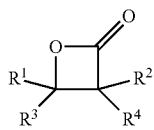

wherein independently in each occurrence $R^1$, $R^2$, $R^3$, $R^4$ are separately in each occurrence hydrogen, a hydrocarbyl moiety or a fluorocarbyl moiety; the hydrocarbyl moiety or fluorocarbyl moiety may optionally contain at least one heteroatom or at least one substituent, wherein at least one $R^1$, $R^2$, $R^3$, $R^4$ are present as the hydrocarbyl moiety or fluorocarbyl moiety.

2. The composition according to claim 1 wherein one or more functional groups of the functionalized beta-propiolactones form a covalent bond or ionic bond with the polymeric layer.

3. The composition according to claim 1, wherein at least one $R^1$, $R^2$, $R^3$, $R^4$ are present as the hydrocarbyl or fluorocarbyl moiety that enhances function of the functionalized beta-propiolactones incorporated into polymer chains useful in coatings or films.

4. The composition according to claim 1, comprising one or more functionalized beta-propiolactone wherein at least one $R^1$, $R^2$, $R^3$, $R^4$ are hydrocarbyl or fluorocarbyl groups that contain one or more of unsaturated groups, electrophilic groups, nucleophilic groups, anionic groups, cationic groups, zwitterions, hydrophobic groups, hydrophilic groups, halogen atoms, natural minerals, synthetic minerals, carbon based particles, an ultraviolet active group, a polymer having surfactant properties, and polymerization initiators.

5. The composition according to claim 1, comprising one or more functionalized beta-propiolactone wherein $R^1$, $R^2$, $R^3$, $R^4$ are separately in each occurrence hydrogen, fluorocarbyl moiety, aryl, substituted aryl, cycloaliphatic, substituted cycloaliphatic, aliphatic or substituted aliphatic moiety.

6. The composition according to claim 1, comprising one or more functionalized beta-propiolactone wherein $R^1$, $R^2$, $R^3$, $R^4$ are separately in each occurrence hydrogen, alkyl, alkenyl, cycloalkyl, heterocyclyl, alkyl heterocyclyl, aryl, aralkyl, alkaryl, heteroaryl, alkyl heteroaryl, or polyoxyalkylene; or two of $R^1$, $R^2$, $R^3$, $R^4$ may form a 5-20 membered cyclic, heterocyclic ring; or $R^1$, $R^2$, $R^3$, $R^4$ may be separately in each occurrence $C_1$-$C_{15}$ alkyl, $C_2$-$C_{15}$ alkenyl, $C_3$-$C_{15}$ cycloalkyl, $C_2$-$C_{20}$ heterocyclyl, $C_3$-$C_{20}$ alkyl heterocyclyl, $C_6$-$C_{18}$ aryl, $C_7$-$C_{18}$ alkaryl, $C_7$-$C_{25}$ aralkyl, $C_5$-$C_{18}$ heteroaryl, $C_6$-$C_{25}$ alkyl heteroaryl, or polyoxyalkylene; or a linking group (L) which functions to link the functional portion of the groups to a cyclic ring.

7. The composition according to claim 1, comprising one or more functionalized beta-propiolactones wherein the substituent is halo, a poly tetrafluoro alkene, alkylthio, alkoxy, hydroxyl, nitro, azido, cyano, acyloxy, carboxy, ester, polyalkylene oxide, unsaturated groups, natural mineral, synthetic mineral, or a carbon-based structure.

8. The composition according to claim 1, comprising one or more functionalized beta-propiolactones wherein one or more of $R^1$, $R^2$, $R^3$, $R^4$ is a halogen substituted alkyl group, a sulfonic acid substituted alkyloxy group, an alkyl sulfonate alkyloxy group, an alkyl ether substituted alkyl group, a polyalkylene oxide substituted alkyl group, an alkyl ester substituted alkyl group, an alkenyloxy substituted alkyl group, an aryl ester substituted alkyl group, an alkenyl group, a cyano substituted alkyl group, an alkenyl ester substituted alkyl group, a cycloalkyl substituted alkyl group, an aryl group, a heteroatom containing cycloalkenyl alkyl ether substituted alkyl group, a hydroxyl substituted alkyl group, a cycloaliphatic substituted alkenyl group, an aryl substituted alkyl group, a haloaryl substituted alkyl group, an aryloxy substituted alkyl group, an alkyl ether substituted alkaryl group, a hetero atom containing cycloaliphatic group substituted alkyl group, an alkyl amide substituted alkyl group, an alkenyl substituted cycloaliphatic group; two of $R^1$ or $R^2$ and $R^3$ or $R^4$ form a cyclic ring, which may optionally contain one or more unsaturated groups, an alkyl group substituted with a beta propiolactone group which may optionally be contain one or more ether groups and/or one or more hydroxyl groups, a glycidyl ether group, or a benzocyclobutene substituted alkyl group, optionally substituted with one or more ether groups, and optionally a linking group (L) which functions to link the functional portion of the groups to the cyclic ring.

9. The composition according to claim 1, comprising one or more functionalized beta-propiolactone wherein $R^1$ is a heterocycle that is polymerizable, such as an oxazoline, or corresponds to one of the formulas;

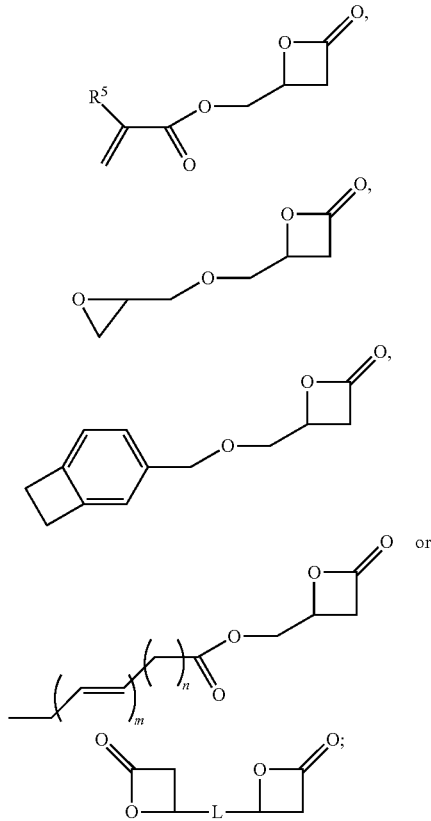

wherein m and n are independently integers of 1 or more, with the proviso that where m, n or both are greater than 1 and the units in parenthesis may be arranged in any manner;

$R^5$ is hydrogen or an alkyl group; and

L is a linking group.

10. The composition according to claim 1, comprising a polymer having pendant electrophilic, nucleophilic, or ionic groups bonded to the homopolymer of one or more functionalized beta-propiolactones or copolymer containing one or more functionalized beta-propiolactones having pendant electrophilic, nucleophilic, or ionic groups bonded to the polymer through the pendant electrophilic, nucleophilic, or ionic groups.

11. The composition according to claim 1, wherein the functionalized beta-propiolactones have one or more pendant groups which are polymerizable by anionic polymerization, cationic polymerization, condensation polymerization, radical polymerization, ring opening metathesis, zwitterions, and a layer of a polymer that polymerizes by anionic polymerization, cationic polymerization, condensation polymerization, or addition polymerization, wherein the one or more of the pendant groups polymerize with the polymer that polymerizes by anionic polymerization, cationic polymerization, condensation polymerization, radical polymerization, or ring opening metathesis, and covalently bond the two layers together.

12. A multilayer polymeric structure comprising separate layers of two incompatible polymers with one or more of beta-propiolactones, functionalized beta-propiolactones or a polymer containing one or more of beta-priopiolactones and functionalized beta-propiolactones disposed between the layers; wherein the polymer containing the one or more functionalized beta-propiolactones is a polypropiolactone and the functionalized beta-propiolactones correspond to the formula:

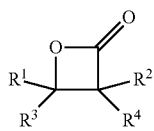

wherein independently in each occurrence $R^1$, $R^2$, $R^3$, $R^4$ are separately in each occurrence hydrogen, a hydrocarbyl moiety or a fluorocarbyl moiety; the hydrocarbyl moiety or fluorocarbyl moiety may optionally contain at least one heteroatom or at least one substituent, wherein at least one $R^1$, $R^2$, $R^3$, $R^4$ are present as the hydrocarbyl or fluorocarbyl moiety.

13. A composition comprising a substrate, a layer of one or more of beta-propiolactones and functionalized beta-propiolactones or a polymer containing one or more of beta-propiolactones and/or functionalized beta-propiolactones, wherein disposed on the layer of one or more of beta-propiolactones and functionalized beta-propiolactones or the polymer containing one or more of beta-propiolactones and/or functionalized beta-propiolactones is a layer of a different polymer, the functionalized beta-propiolactones or the polymer containing one or more of beta-propiolactones and/or functionalized beta-propiolactones have pendant groups which form a covalent bond, ionic bond, polymerize with the different polymer or which initiate polymerization of the different polymer; wherein the polymer containing the one or more functionalized beta-propiolactones is a polypropiolactone and the functionalized beta-propiolactones correspond to the formula:

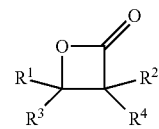

wherein independent in each occurrence $R^1$, $R^2$, $R^3$, $R^4$ are separately in each occurrence hydrogen, a hydrocarbyl moiety or a fluorocarbyl moiety: the hydrocarbyl moiety or fluorocarbyl moiety may optionally contain at least one heteroatom or at least one substituent, wherein at least one $R^1$, $R^2$, $R^3$, $R^4$ are present as the hydrocarbyl or fluorocarbyl moiety having pendant groups which form the covalent bond, ionic bond, polymerize with the different polymer or which initiate polymerization of the different polymer.

14. The composition according to claim 1, comprising two or more layers of different polymers having between each of the layers, the layer of a homopolymer of one or more functionalized beta-propiolactones or copolymer containing one or more functionalized beta-propiolactones and beta-propiolactone.

* * * * *

UNITED STATES PATENT AND TRADEMARK OFFICE
CERTIFICATE OF CORRECTION

PATENT NO. : 11,780,958 B2
APPLICATION NO. : 18/020722
DATED : October 10, 2023
INVENTOR(S) : Geoffrey W. Coates et al.

It is certified that error appears in the above-identified patent and that said Letters Patent is hereby corrected as shown below:

In the Claims

Column 17, Claim 6, Line 58, "$C_3$-$C_{15}$ cycloalkyl" should be —$C_3$-$C_9$ cycloalkyl—

Column 17, Claim 6, Line 60, "$C_7$-$C_{18}$ alkaryl" should be —$C_7$-$C_{25}$ alkaryl—

Column 19, Claim 11, Lines 19-20, "metathesis, zwitterions," should be —metathesis or zwitterions,—

Column 20, Claim 14, Line 43, "layer of a homopolymer" should be —layer of the homopolymer—

Signed and Sealed this
Thirteenth Day of February, 2024

Katherine Kelly Vidal
*Director of the United States Patent and Trademark Office*